United States Patent [19]
Steckler

[11] 3,715,499
[45] Feb. 6, 1973

[54] DUAL MODE AUTOMATIC FREQUENCY CONTROLLED OSCILLATOR SYSTEM

[75] Inventor: Steven Alan Steckler, Clark, N.J.
[73] Assignee: RCA Corporation

[22] Filed: Dec. 3, 1970
[21] Appl. No.: 94,889

[52] U.S. Cl. ...........178/69.5 TV, 307/232, 307/295, 331/17, 331/20
[51] Int. Cl. ...............................................H04n 5/04
[58] Field of Search ....178/7.3 S, 7.3 R, 7.5 S, 7.5 R, 178/5.8 A, 5.8 F, 69.5 TV; 331/8, 17, 20, 25–28; 307/295, 232, 233

[56] References Cited

UNITED STATES PATENTS

| | | | |
|---|---|---|---|
| 2,828,419 | 3/1958 | Gruen | 331/17 |
| 2,962,666 | 11/1960 | Pollak | 331/17 X |
| 3,287,657 | 11/1966 | Widl | 331/17 |
| 3,363,194 | 1/1968 | Hileman | 331/17 |

*Primary Examiner*—Robert L. Richardson
*Attorney*—Eugene M. Whitacre

[57] ABSTRACT

A dual mode automatic phase controlled oscillator system employs multiple keyed phase comparators to produce control signals which are applied to lock the oscillator frequency and phase to a reference signal. One of the keyed comparators is continuously employed to produce an in-sync control signal. A coincidence gate is utilized to detect the existence of out-of-sync conditions, and associated circuitry produces a mode control signal which is applied to activate the second keyed phase comparator upon such occurrence. The second keyed comparator is thereby selectively operative during out-of-sync conditions to develop an additional control signal to enhance the pull-in characteristics of the system.

13 Claims, 3 Drawing Figures

INVENTOR.
Steven A. Steckler
BY
H.W. Reick
ATTORNEY

INVENTOR.
Steven A. Steckler
BY H.W. Reick
ATTORNEY

INVENTOR.
Steven A. Steckler

BY H.W. Reick

ATTORNEY

DUAL MODE AUTOMATIC FREQUENCY CONTROLLED OSCILLATOR SYSTEM

The present invention relates to an automatic phase control (APC) oscillator system suitable for use as the horizontal oscillator in a television receiver.

Conventional automatic phase control systems used in television receivers to synchronize an oscillator therein with received synchronization signals are designed as a compromise between adequate pull-in capability and noise-immune performance. When an APC system is to have sufficiently wide bandwidth to provide a fast pull-in time and a relatively wide pull-in range, the time constant of the APC filter network will be relatively short; thus, impulse or thermal noise may be coupled through the APC system to its controlled oscillator and may cause loss of synchronization or timing errors (which appear as jitter of the video display) of the output signal from the oscillator.

A solution to this design compromise is to employ a dual mode system which has different transfer characteristics during in-synchronization and out-of-synchronization conditions. A coincidence detector can be employed in such a system to detect the existence, or absence, of synchronization and provide a control signal for a mode switching means which will change the operation of the system as conditions change. When in synchronization, for example, the dual mode APC system can display a relatively narrow bandwidth characteristic and therefore will have relatively high noise immunity. When out of synchronization, the characteristics of the system can be changed, for example, by changing the APC filter to increase the bandwidth to allow fast pull-in over a wide pull-in range until synchronization is again achieved. Once the synchronization has been achieved, the dual mode system can again be switched into the relatively noise-immune narrow bandwidth mode of operation.

A difficulty with such a dual mode system has been that when the transfer characteristics of the system (i.e., gain and bandwidth) are changed by switching filter components into and out of the APC loop, transient voltage changes may exist which can cause temporary loss of synchronization. These transients can be caused, for example, by switching a discharged or partially discharged capacitor into the APC filter to change the filter network response. If the voltage across the capacitor is not equal to the voltage of the circuit to which it is coupled, a sudden change in the output voltage level of the APC system may result. This change in the output voltage, when applied to the associated controlled oscillator, can cause a loss of synchronization until the APC system can again pull the oscillator into synchronization.

In one prior dual mode system, a single phase comparator was used to develop the APC control voltage. Dual mode operation was accomplished by employing a second phase comparator only to detect the presence or absence of synchronization, and controls an active device to switch a filter component into or out of the APC filter. Such a system may be subject to the undesirable transients mentioned above; and, if the switching device has an offset voltage, additional undesirable voltage changes may result during the switching from one mode of operation into the other mode of operation.

Systems embodying the present invention, on the other hand, include a matched pair of keyed phase comparators, one of which is used to provide a control signal during the in-synchronization mode of operation — when the oscillator is in synchronism with the horizontal scanning rate pulses —, while the second of which is used to provide a control signal during out-of-synchronization conditions — when the oscillator signals and the scanning rate pulses are not in time coincidence. As will be seen below, the first control signal is applied to the oscillator via a relatively narrow bandwidth filter network to provide the desired noise-immune characteristic during in-sync operation. The second control signal is applied, however, via a relatively wide bandwidth filter network to provide the increased pull-in range desired for out-of-sync conditions. As will also become clear, the keying of the second comparator is useful in preventing, for example, the application of the second control signal to the oscillator during in-sync operation, whereas the matching of the comparators is useful in coupling the signals to the two filter networks at substantially the same direct voltage level for both modes of operation.

The invention can best be understood by referring to the figures and accompanying description thereof in which.

Figure 1:
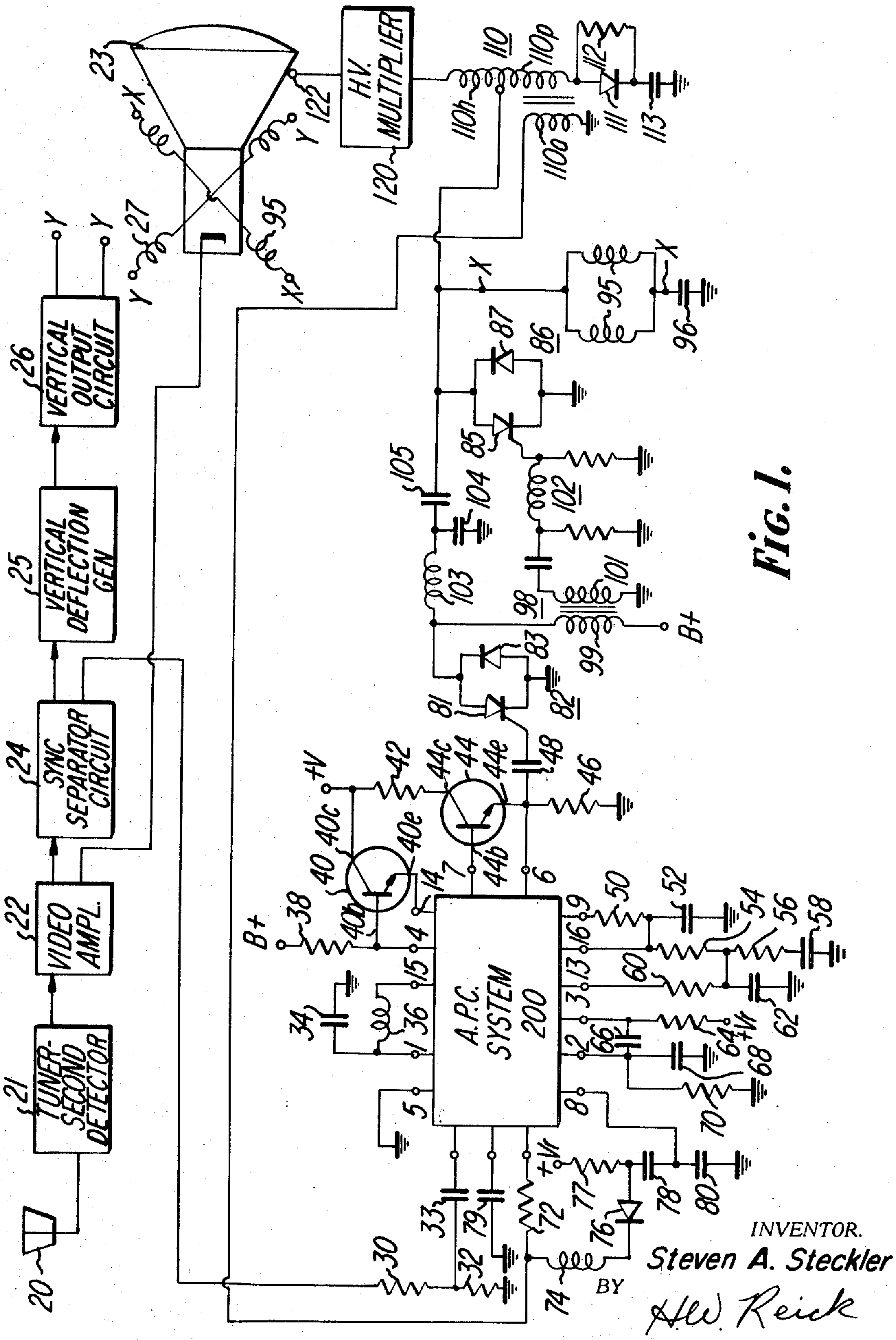
FIG. 1 is an electrical circuit diagram partially in schematic and block diagram form of a television receiver including the present invention.

In FIG. 1, the television receiver includes an antenna 20 which receives composite television signals and which couples the received signals to a tuner-second detector 21. The tuner-second detector 21 may include a radio frequency amplifier for amplifying the received signals, a mixer-oscillator for converting the amplified radio frequency signals to intermediate signals, an intermediate frequency amplifier, and a detector for deriving composite television signals from the intermediate frequency signals. The resulting composite television signals are applied to a video amplifier 22. The amplified luminance signals from amplifier 22 are applied to a control electrode (e.g., the cathode) of a television kinescope 23. Although the receiver illustrated in the block diagram has only black and white television receiver circuitry, the receiver could be a color television receiver in which case appropriate chrominance circuits would also be employed to derive the transmitted color information which could be displayed on a conventional tri-gun shadow-mask type color kinescope.

The composite television signals from amplifier 22 are also applied to a synchronization separator 24. The sync separator 24 separates the horizontal and vertical synchronization components from the composite television signal and separates the vertical synchronization components from the horizontal synchronization components. The vertical synchronization components from stage 24 are applied to a vertical deflection generator 25. The vertical deflection signal generator 25 develops vertical deflection frequency signals and applies them to a vertical output circuit 26. The vertical output circuit 26 responds to the applied vertical frequency signals to develop the required vertical deflection current which is coupled to a vertical deflection yoke by means of interconnections Y—Y.

Horizontal synchronization signals from sync separator circuit 24 are applied to a horizontal APC system 200 by means of a resistive voltage divider 30, 32 and a coupling capacitor 33. The APC system 200 is shown in block form and can be fabricated from a single integrated circuit. The peripheral (interface) electrical components employed when such an integrated circuit is used are shown in FIG. 1. The terminal numbers associated with the terminals on the APC system 200 correspond to the terminals identified with the APC system shown in greater detail in FIGS. 2 and 3.

The horizontal synchronization signals are applied to an input terminal 12. Flyback pulses from an auxiliary winding 110a on a horizontal output transformer 110 are applied to terminal 11 of the APC system by means of a series resistance 72. Integrated flyback pulses from winding **110*a* are applied to terminal 8 of the APC system by means of an inductor 74 and a diode 76, which coupled negative going flyback pulses to the junction of a resistor 77 and a capacitor 78, serially coupled between a regulated potential $+V_r$ and ground potential by means of a capacitor 80. The junction of capacitors 78 and 80 is coupled to terminal 8 of the APC system. Terminal 10 is coupled to ground by means of a capacitor 79. Terminal 2 is coupled to ground by means of the parallel combination of a capacitor 68 and a resistor 70. A capacitor 66 also couples terminal 2 to terminal 3. Terminal 3 is further coupled to the regulated voltage $+V_r$ by means of a resistor 64. Terminal 13 is coupled to ground by means of the series combination of a resistor 60 and a capacitor 62. Terminal 16 is coupled to ground by means of the series combination of resistor 54, resistor 56 and a capacitor 58. The junction of resistors 54 and 56 is connected to the junction of resistor 60 and capacitor 62. Terminal 9 is coupled to ground by means of the series combination of a resistor 50 and a capacitor 52. The junction of resistor 50 and capacitor 52 is connected to terminal 16**.

Terminal 5 of the APC system 200 is connected directly to ground. An inductor 36 is coupled between terminals 1 and 15 and a capacitor 34 is coupled from terminal 1 to ground. Terminal 4 is coupled to a B+ supply by means of a resistor 38. A voltage regulating transistor 40 has a collector terminal **40*c* coupled to a positive voltage source +V, a base terminal 40*b* coupled to terminal 4 and an emitter terminal 40*e* coupled to terminal 14 of the APC system. A driver transistor 44 has a terminal 44*c* coupled to the +V source by means of a resistor 42. A base terminal 44*b* of transistor 44 is coupled to output terminal 7 of the APC system while an emitter terminal 44*e* of transistor 44 is coupled to output terminal 6 of the APC system. An emitter resistor 46 couples the junction of terminal 44e and terminal 6 to ground. Horizontal frequency output signals from the APC system are capacitively coupled to the horizontal output stage 90 by means of a coupling capacitor 48**.

The horizontal output stage 90 is a two-stage silicon controlled rectifier (SCR) type, as described in U.S. Pat. No. 3,452,244 which is assigned to the present assignee. The output stage comprises a bi-directional trace switching means 86 comprising an SCR 85 and a trace diode 87, and a bi-directional commutating switch 82 comprising an SCR 81 and a diode 83. Operating power is applied to the stage from a B+ source by means of an input transformer 98 having a primary winding 99. Transformer 98 also includes a secondary winding 101 which operates in conjunction with a trigger circuit 102 to supply a triggering signal to the gate electrode of SCR 85. The trigger circuit is described in a co-pending application, filed on Aug. 25, 1969, Ser. No. 852,673, issued as U.S. Pat. No. 3,638,067, entitled "Triggering Circuit for CRT Deflection System Utilizing an SCR," which is assigned to the present assignee, and employs capacitive coupling to the winding 101 along with a pair of resistors coupling opposite ends of an included inductor to ground.

A horizontal deflection yoke 95 is coupled across the trace switch means 86 by a series coupled S-shaping capacitor 96. The series combination of a commutating inductor 103 and retrace capacitor 105 couples the commutating switch 82 to the trace switch 86 — i.e., couples the anode of SCR 81 to the corresponding electrode of SCR 85. An auxiliary capacitor 104 is coupled from the junction of inductor 103 and capacitor 105 to ground. A flyback transformer 110 has a primary winding 110p coupled across the trace switch 86 by means of an arc suppression network comprising a diode 111 having a parallel coupled resistor 112, with the resulting combination being coupled in series with a capacitor 113 to ground. As shown, the anode of diode 111 is connected to the winding 110p while the cathode of the diode is connected to capacitor 113. As also illustrated, the anode of SCR 85 is connected to the cathode of diode 87, the anode of which is connected to the cathode of SCR 85 and to ground. Similarly, the anode of SCR 81 is connected to the cathode of diode 83, while the cathode of SCR 81 is connected to the anode of diode 83 and to ground.

The operation of the horizontal output stage is described in detail in U.S. Pat. No. 3,452,244, the disclosure of which is to be incorporated herein by reference. It is noted, however, that during each horizontal retrace interval, flyback pulses are developed across the primary winding **110*p* of the flyback transformer 110. These flyback pulses are stepped up in voltage by a high voltage winding 110*h* on flyback transformer 110. A high voltage multiplier circuit 120 coupled to winding 110h provides the ultor voltage to the kinescope 23 by means of a terminal 122. The flyback pulses, which are representative of the frequency of operation of the horizontal deflection system, are inductively coupled to an auxiliary winding 110*a* to supply the reference signal for the APC system 200**.

In operation, the APC system compares the timing relationship between the incoming horizontal sync pulses from sync separator circuit 24 and the flyback pulses applied from winding **110*a***. When there is time coincidence between these pulses (i.e., the horizontal oscillator is in synchronism with the horizontal sync pulses), the APC system operates in a first mode employing a first keyed phase comparator and a first filter network which has a relatively narrow bandwidth, thus providing good noise immunity from random thermal and impulse noise interference. If, however, the incoming sync pulses and reference signals are not in time coincidence, a coincidence gate in the APC system detects this timing error and mode switching means are enabled to activate a second keyed phase comparator which is coupled to a voltage controlled oscillator (VCO) in the APC system. In particular, this coupling is accomplished through a different APC filter which displays a relatively wide bandwidth, thereby increasing the pull-in range of the system. Once the VCO is again at the proper frequency and time coincidence exists between the incoming synchronization pulses and the flyback pulses, the mode switching means de-activates the second keyed phase comparator and the first mode of operation is restored.

A reference sawtooth signal which is applied to terminal 8 of the APC system 200 — and which is used to develop the control voltage for the VCO — is generated in the following manner. During horizontal trace intervals, the voltage developed across the winding 110a is sufficiently positive such that diode 76 will be reverse biased and a charging current from the regulated $+V_r$ supply charges capacitors 78 and 80 through resistor 77 — thus, a positive going sawtooth signal is generated at the junction of capacitors 78 and 80 during horizontal trace. During horizontal retrace, the voltage across winding 110*a* swings sharply negative, causing diode 76 to conduct and rapidly discharge capacitors 76 and 80, thereby forming a relatively sharp negative going sawtooth signal at the noted junction. Inductor 74 is employed to provide a time delay between the negative slope of the reference sawtooth and the arriving horizontal sync pulses such that the timing relationship between the two signals will provide a properly centered video display. In some applications the inductor may be made adjustable or eliminated entirely. The relatively sharp negative slope portion of the sawtooth signal is sampled by the keyed phase comparators during the horizontal sync pulse interval and will provide a corrective error signal representative of timing errors between the VCO and the incoming horizontal sync pulses.

The inductor 36 and capacitor 34 provide a resonant circuit for the oscillator employed in the APC system which in one embodiment is of the L-C type. The regulated voltage $+V_r$ is developed at the emitter terminal 40e of transistor 40 and is supplied to the APC system at terminal 14. Terminal 4 of the APC system is coupled to Zener diodes within the APC system, thereby providing a constant base voltage at terminal 40b of regulator transistor 40. The collector terminal 40c of transistor 40 is supplied an operating potential by the +V voltage which also serves as the collector supply for the driver transistor 44. A detailed description of the individual circuits employed in the APC system and the operation of the APC system 200 is presented in conjunction with FIG. 2.

Figure 2:
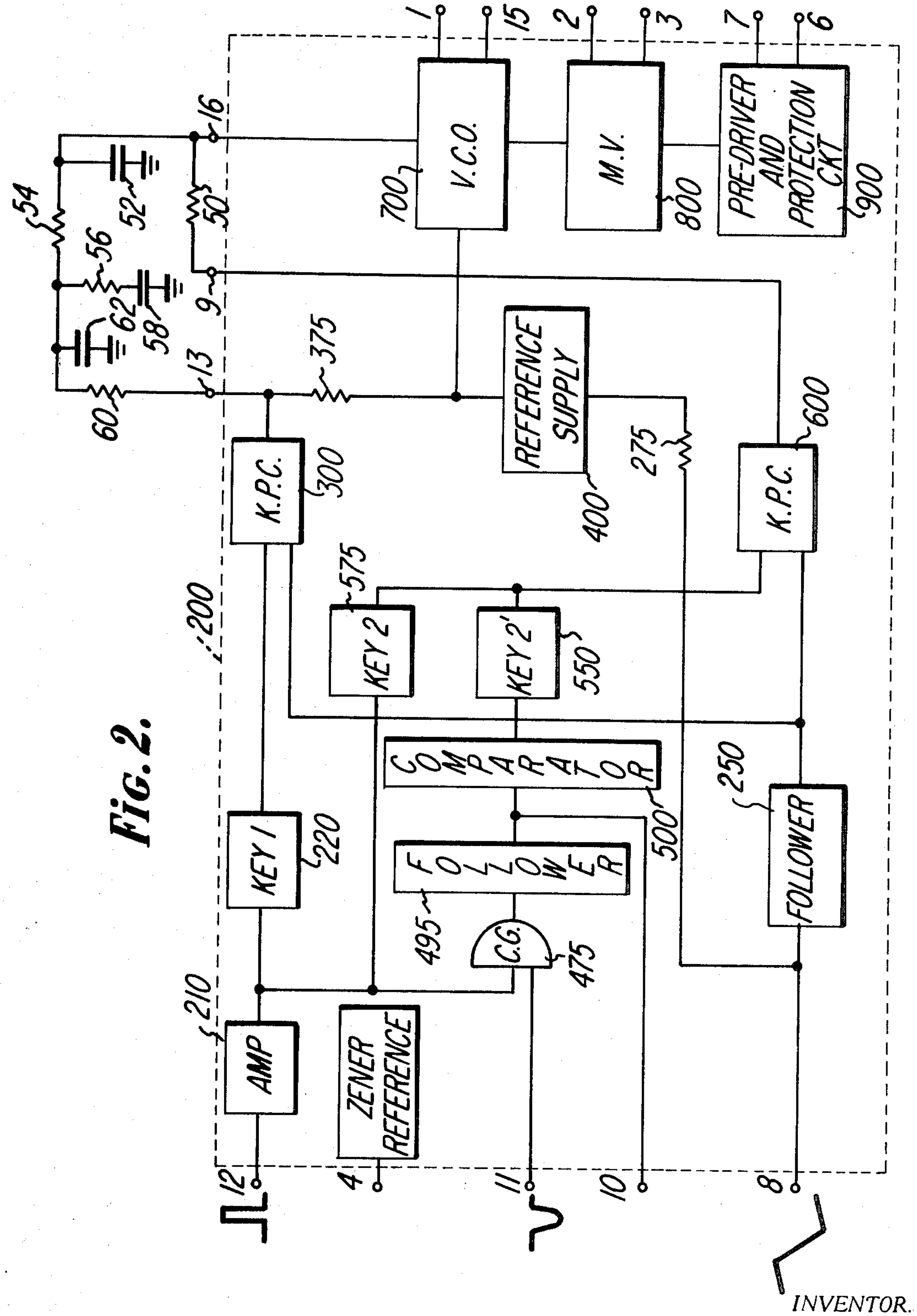
FIG. 2 is a block diagram of the APC system shown in FIG. 1.

In the APC system 200 of FIG. 2, horizontal synchronization pulses are applied to terminal 12 and are illustrated by the waveform adjacent terminal 12. The sync pulses are amplified by a synchronization amplifier 210. The output of amplifier 210 is coupled to a first keying circuit 220, a second keying circuit 575 and a coincidence gate 475. The output of keying circuit 220 is coupled to a keying input of a first keyed phase comparator (KPC) 300. The output of KPC 300 is applied to a first external filter network comprising resistor 60, capacitor 62, resistor 56, capacitor 58, resistor 54 and capacitor 52 by means of terminal 13. The output of the first filter is coupled to a voltage controlled oscillator (VCO) 700 by means of terminal 16. The output of VCO 700 is coupled to a multivibrator 800, and the output of the multivibrator 800 is coupled to a pre-driver and protection circuit 900.

Flyback pulses illustrated adjacent terminal 11 are applied to the APC system 200 at terminal 11 and are applied to the coincidence gate 475. An output terminal of the coincidence gate is coupled to a follower circuit 495 and an output terminal of circuit 495 is coupled to an input terminal of a comparator circuit 500. Terminal 10 is also coupled to the input terminal of the comparator circuit 500. The output of the comparator circuit is coupled to an input terminal of a further keying circuit (KEY 2') 550. The output of keying circuit 550 is coupled to a second keyed phase comparator 600. The output of the second keyed phase comparator 600 is coupled to a second external filter network including a resistor 50, by means of terminal 9. The output of the second filter network is also coupled to the input of the VCO 700 by means of terminal 16.

Integrated flyback pulses which serve as the sawtooth reference signal are illustrated adjacent terminal 8. These signals are applied to an input follower circuit 250 by means of terminal 8. The output of follower circuit 250 is coupled to the first keyed phase comparator 300 and to the second keyed phase comparator 600. A reference voltage supply 400 applies a first voltage to the input terminal of follower 250 by means of a resistor 275, and also applies a second voltage to the VCO 700 and to the terminal 13 by means of a resistor 375. Terminal 4 of the APC system 200 is coupled to a Zener reference circuit. Terminals 5 and 14 shown in FIG. 1 are the ground terminal and regulated voltage supply terminal, respectively; though not shown in FIG. 2, it will be understood that the various circuits shown in block diagram form in FIG. 2 are coupled to these terminals. In describing the operation of the system, the in-synchronism mode of operation will first be explained.

The sync pulses applied to sync amplifier 210 are amplified and inverted by amplifier 210 and serve as a keying signal for the first keying circuit 220 and the second keying circuit 575. The keying circuits 220 and 575 are of the type which produce an output keying signal in the presence of an applied sync pulse from amplifier 210. The first keying circuit 220 is coupled to the keyed phase comparator 300 such that during the horizontal sync pulse interval, comparator 300 will be activated to sample the sawtooth reference voltage applied to its input from input follower 250. When in synchronization, the sample interval occurs during the relatively sharp negative slope portion of the sawtooth reference signal. It is noted that the keyed phase comparator 300 will sample the reference signal during each sync pulse interval whether or not the voltage controlled oscillator is in synchronism with the incoming synchronization pulses. The keyed phase comparator 300 produces an output signal which is filtered by the first filter network described above, to provide a control voltage for the VCO 700. It is noted that this first filter network has a relatively narrow bandwidth and thereby provides a highly noise-immune control signal during in-synchronism operation.

The flyback pulses from winding 110a in FIG. 1 are also applied to the coincidence gate 475. During in-synchronization operation, these flyback pulses, which are approximately 10 μseconds in duration, will be in time coincidence with the incoming horizontal sync pulses and the coincidence gate 475 will detect this time coincidence to provide a first output signal during in-sync conditions. When the incoming sync pulses and flyback pulses do not coincide, the coincidence gate will produce a second output signal. The output of the coincidence gate 475 is amplified by follower circuit 495 and filtered by a capacitor which is coupled to interface terminal 10 (FIG. 1) and then applied to a comparator circuit 500 including a reference supply. The comparator circuit 500 is fabricated such that it will produce mode control signals in response to the first and second output signals from coincidence gate 475. During in-sync conditions, the comparator will produce a signal in response to the first output signal from circuit 475 which holds the keying circuit 550 in its quiescent state. Thus, although keying circuit 575 will produce a keying signal at its output terminal during each horizontal sync pulse interval, keying circuit 550 will in its quiescent state however prevent the keying signal from triggering keyed phase comparator 600 during in-sync operation, thereby effectively inactivating the keyed phase comparator 600 during in-sync operation. Thus, the control voltage which is coupled to the voltage controlled oscillator is produced only by the first keyed phase comparator 300 during in-sync conditions.

When out of sync, however, the mode control signal developed by comparator 500 in response to the second output signal from circuit 475 will activate keying circuit 550 such that the keying signal from keying circuit 575 will be allowed to trigger keyed phase comparator 600 during the horizontal sync interval during which time comparator 600 will sample the reference signal applied to its input from follower 250 and produce an output signal which is coupled to the second filter network by means of terminal 9. The second filter network has a relatively wide bandwidth, thereby increasing the pull-in range of the APC system in response to the output signal from the keyed phase comparator 600. The output signals from the keyed phase comparators 300, 600 will vary the control voltage applied to the VCO 700 in a manner to change the frequency of the voltage control oscillator to correct the frequency errors between the oscillator output frequency and the incoming sync pulse frequency. Although the first keyed phase comparator is operative during both in and out-of-sync conditions in one embodiment, it could be inactivated during out-of-sync conditions in other embodiments. In one embodiment, the APC system shown in block diagram form in FIG. 2 was fabricated on a single monolithic integrated circuit substrate which is shown in detail in FIG. 3. When so fabricated, the reference voltage supply 400 is employed to provide DC voltage levels to balance the voltage controlled oscillator.

Figure 3:
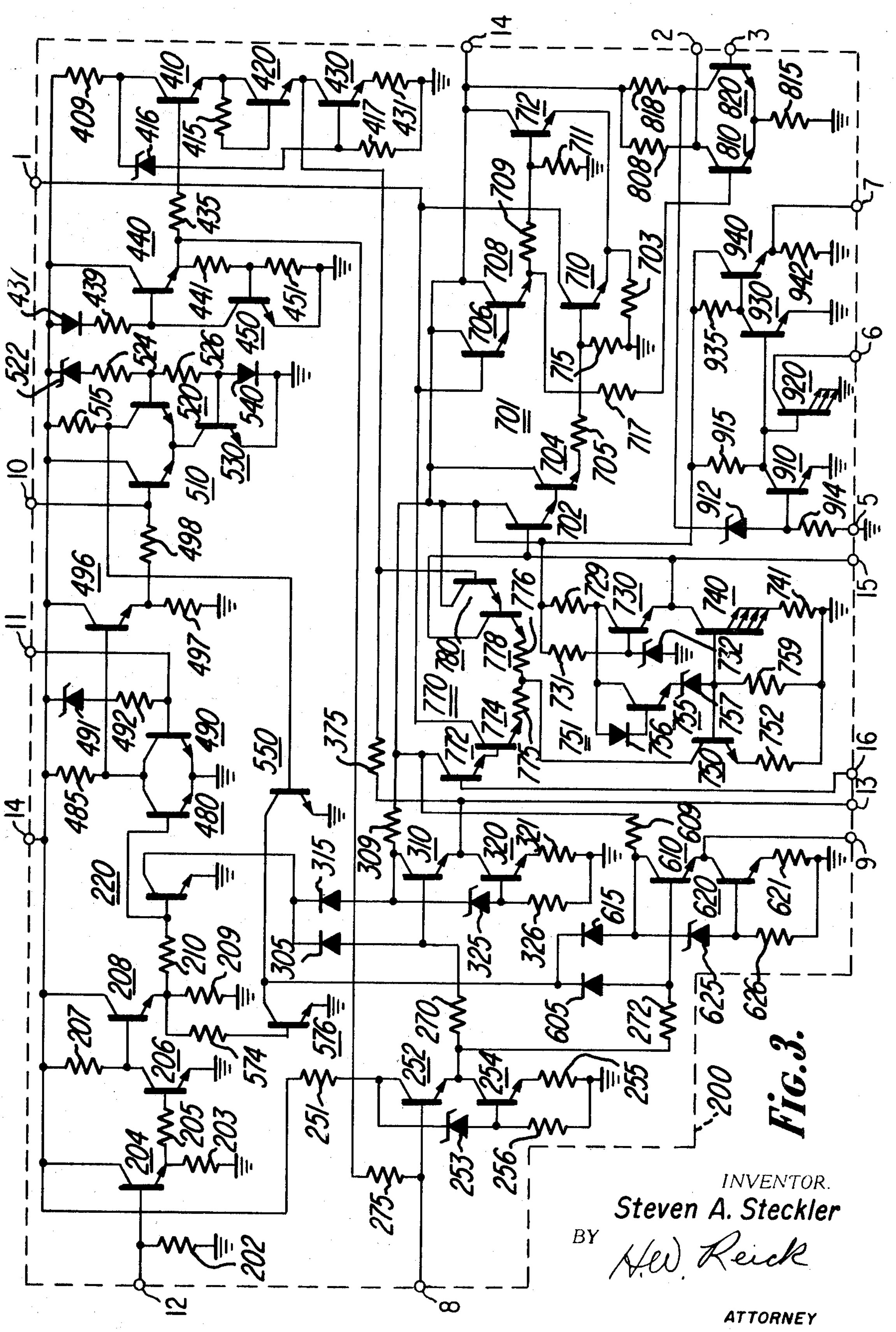
FIG. 3 is a detailed schematic diagram of an APC system which can be integrated on a monolithic substrate.

In FIG. 3, the sync amplifier which receives the horizontal scanning rate pulses provided at terminal 12 comprises an input transistor 204 coupled in an emitter follower configuration, and having a base resistor 202 and an emitter resistor 203 coupled from a base terminal and an emitter terminal to ground, respectively. Signals from the emitter of transistor 204 are coupled to a base terminal of an amplifier transistor 206 by means of a resistor 205. A collector resistor 207 couples a collector terminal of transistor 206 to the supply voltage at terminal 14. An output emitter follower transistor 208 is also included in the sync amplifier and has a base terminal coupled to the collector terminal of transistor 206. Output signals developed across an emitter resistor 209 of transistor 208 are applied to a keying circuit transistor 220 — more particularly, to its base terminal — by means of a coupling resistor 210. Keying transistor 220 is normally "ON" but responds to the incoming sync pulses to be switched into its nonconductive state. While conductive, transistor 220 completes a conduction path to ground which includes diodes 305 and 315 associated with the first keyed phase comparator 300 shown in FIG. 2.

The first phase comparator also includes transistors 310 and 320. A feedback path including an avalanche diode 325 couples a collector terminal of transistor 310 to a base terminal of transistor 320. A resistor 326 couples a base terminal of transistor 320 to ground and an emitter resistor 321 couples an emitter terminal of transistor 320 to ground. While keying transistor 220 is conductive, diodes 305 and 315 are likewise conductive to maintain transistors 310 and 320 of the first keyed phase comparator in their nonconductive state. During the sync pulse interval, however, transistor 220 is nonconductive which allows transistors 310 and 320 to be conductive and operate as an amplifier to sample the incoming reference signal which is applied to a base terminal of transistor 310. A detailed description of the operation of the first keyed phase comparator is presented in a co-pending application entitled, "Sample and Hold Circuit" by S. A. Steckler, Ser. No. 50,592, filed on June 29, 1970, issued as U.S. Pat. No. 3,641,258 and assigned to the present assignee.

The sawtooth reference signals applied to terminal 8 of the APC circuit 200 are coupled to the first keyed phase comparator by means of the input follower (250 of FIG. 2) which comprises a transistor 252 and transistor 254 having their collector-to-emitter current paths serially coupled between the operating supply 14 and ground by means of resistors 251 and 255. The sawtooth reference signal is applied to a base terminal of transistor 252. A negative feedback path between a collector terminal of transistor 252 and a base terminal of transistor 254 comprises an avalanche diode 253. A resistor 256 is coupled from the base of transistor 254 to ground. The output signal present at the junction of an emitter terminal of transistor 252 and a collector terminal of transistor 254 is applied to the first keyed phase comparator by means of a coupling resistor 270. The average output signal from the first keyed phase comparator will be representative of the timing relationship between the incoming sync pulses which serve to key the phase comparator into its sample mode of operation and the reference voltage which is a sawtooth signal having a relatively sharp slope. As the timing relationship between the reference signal and the incoming sync pulses vary, the average output signal of the keyed phase comparator will change in a direction to provide a corrective signal which is applied to the first filter network shown in FIG. 2 by means of terminal 13, coupled to the junction of the emitter terminal of transistor 310 and the collector terminal of transistor 320. This output signal is applied to the voltage controlled oscillator 700 (in FIG. 2) by means of terminal 16.

The voltage controlled oscillator shown in FIG. 3 includes an amplifier 701 including circuit components 702–717 coupled as shown in FIG. 3, a current sampler 751 including circuit components 729–759 coupled as shown in FIG. 3 and a current splitter circuit 770 including the circuit components 770–780 coupled as shown in FIG. 3. A detailed description of the operation of this voltage controlled oscillator is presented in a co-pending application entitled, by S. A. Steckler, Ser. No. 862,705, filed on Oct. 1, 1969, issued as U.S. Pat. No. 3,636,475, entitled "Oscillator With Variable Reactive Current Frequency Control" and assigned to the present assignee. The current sampler is likewise described in a co-pending application by S. A. Steckler, Ser. No. 862,759, filed on Oct. 1, 1969, issued as U.S. Pat. No. 3,641,448, entitled "Transistor Signal Translating Stage" and assigned to the present assignee. The voltage controlled oscillator responds to the control signal applied at terminal 16 to return the oscillator to the desired phase and frequency (i.e., incoming sync pulse frequency) by varying the quadrature current developed by the current sampling circuit 751 which flows in shunt relationship with the L-C tank circuit across terminals 1 and 15. The control is effected by varying the voltage on a base terminal of transistor 772 in current splitter 770 to effect a varying current division in the differential current splitter, thereby changing the quadrature current which flows in shunt with the L-C tank circuit.

The sinusoidal output signal from the VCO at an emitter terminal of transistor 708 is applied to a multivibrator circuit comprising transistors 810 and 820 by means of a resistor 717. Transistors 810 and 820 have emitter terminals coupled at a common junction which is further coupled to ground by means of a resistor 815. A collector terminal of transistor 810 is coupled to the operating potential by means of a collector resistor 808 and a collector terminal of transistor 820 is coupled to the operating potential by means of a resistor 818. The charging capacitors for the multivibrator are coupled externally to the integrated circuit by means of terminals 2 and 3. These capacitors are shown in FIG. 1. The resulting square wave output signals from the multivibrator are applied to a pre-driver circuit from a collector terminal of transistor 820.

An avalanche diode 912 in the pre-driver circuit applies pulses from the multivibrator circuit to a base terminal of transistor 910 which serves as a pre-driver amplifier stage. The base terminal of transistor 910 is coupled to ground by means of a resistor 914, while an emitter terminal of transistor 910 is directly coupled to ground. A collector terminal of transistor 910 is coupled to the source of operating voltage by means of a resistor 915. An output driver transistor 920 has a base terminal coupled to the collector terminal of transistor 910 and an emitter terminal coupled to ground. In some applications, this transistor may be of the multiple emitter type as shown schematically by the multiple emitter representation symbol. The collector of transistor 920 is coupled to the output terminal 6. Transistor 920 serves as the discharge current path for gate current of the SCR 81 in FIG. 1 to allow rapid turn off of the SCR. Pulses at the collector terminal of transistor 910 are also coupled to a base terminal of transistor 930 which has a grounded emitter terminal. A collector terminal of transistor 930 is coupled to the operating potential source by means of a resistor 935. An emitter follower stage including a transistor 940 couples amplified pulses at the collector terminal of transistor 930 to output terminal 7. A collector terminal of transistor 940 is coupled to the power source and an emitter resistor 942 coupled from an emitter terminal of transistor 940 develops the output signals.

A protection circuit comprising transistor 930 is coupled in the circuit to prevent damage to the output driver transistor 920 in the event that terminal 6 is shorted to a voltage source during servicing of the receiver. Such a short circuit would, without the addition of the protection circuit to limit the collector current through transistor 920, burn out transistor 920. The protection circuit including transistor 930 is described in detail in a concurrently filed application entitled "Protection Circuit" By A. L. Limberg and S. A. Steckler, issued as U.S. Pat. No. 3,641,361, which is assigned to the present assignee.

Turning now to the dual mode circuitry in FIG. 3, it is seen that the coincidence gate (475 in FIG. 2) comprises transistors 480 and 490 shown in FIG. 3. The emitter terminals of transistors 480 and 490 are coupled to ground and their collector terminals are coupled to a common junction which is coupled to the source of operating potential by means of a resistor 485. The incoming sync pulses from the sync amplifier are applied to a base terminal of transistor 480 while the flyback pulses from winding 110a shown in FIG. 1 are coupled to the base of transistor 490 by means of terminal 11. An avalanche diode 491 and a resistor 492 serve to bias transistor 490 such that transistor 490 will normally be conductive. Upon the coincident arrival of a synchronization pulse to transistor 480 and a flyback pulse from terminal 11 transistors 480 and 490 will become nonconductive, thereby producing a positive going signal at their common collector junction point which serves as the output terminal for the coincidence gate. This output signal is coupled to a follower circuit (495 in FIG. 2) comprising a transistor 496 having a collector terminal coupled to the source of operating potential and an emitter terminal coupled to ground by means of a resistor 497. The output of the follower circuit is coupled to an external filter capacitor by means of a resistor 498 which couples the emitter terminal of transistor 496 to terminal 10 of the integrated circuit. The external capacitor is then coupled from terminal 10 to ground as shown in FIG. 1. The output from the filter network is coupled to a comparator circuit (500 in FIG. 2) comprising transistors 510, 520 and 530 coupled in a differential switch configuration. The base voltage of transistor 520 is held constant by means of a voltage dividing network including an avalanche diode 522, a resistor 524, a resistor 526, and a diode 540 coupled from the operating potential source to ground. The base of transistor 520 is coupled to the junction of resistors 524 and 526. Transistor 530 serves as a current source for the differentially coupled transistors 510 and 520. The signal applied to the base terminal of transistor 510 will be greater than the voltage at the base of transistor 520 during in-sync operation but less than the voltage at the base of transistor 520 during out-of-synchronization operation. Thus, during in-synchronization transistor 5 10 will be conductive while transistor 520 will be held nonconductive and during out-of-sync operation, transistor 510 will be nonconductive while transistor 520 will be conductive. The output signal which is developed across a collector resistor 515 of transistor 520 will thereby be a positive signal during in-sync operation or a much less positive signal during out-of-sync operation. This signal is applied to the keying circuit means (550 in FIG. 2) which comprises a keying transistor 550 in FIG. 3. It is seen that the sync pulses from the sync amplifier are coupled through a resistor 574 to the keying circuit means (575 in FIG. 2) which comprises a transistor 576 having a collector terminal coupled to a collector terminal of transistor 550 in FIG. 3. Thus, although transistor 576 will be cut off in response to each incoming sync pulse, transistor 550 will be continuously conductive during in-sync operation, thereby providing a conduction path for diodes 605 and 615 associated with the second keyed phase comparator (600 in FIG. 2) and will during in-synchronization operation maintain the second keyed phase comparator nonconductive (in its hold mode of operation). The second keyed phase comparator comprises the transistors 610, 620 and circuit components 605, 609, 615, 621, 625, and 626 and is identical to the first keyed phase comparator and operates in the same manner. The sawtooth reference signals from the input follower circuit are applied to the base of transistor 610 of the second keyed phase comparator by means of a resistor 272. The output signal present at the junction of the emitter terminal of transistor 610 and the collector terminal of 620 are applied to the second filter network by means of terminal 9. During out-of-sync conditions, keying transistor 550 will be non-conductive due to the application of a relatively low voltage from the comparator (500 in FIG. 2), thus as transistor 576 becomes nonconductive, due to the application of horizontal sync pulses to the base terminal, diodes 605 and 615 become nonconductive, thereby activating the transistors 610 and 620 in the second keyed phase comparator. The second keyed phase comparator will during the sync pulse keying interval therefore sample the sawtooth reference signal applied to the base of transistor 610 and produce at output terminal 9 a signal which, when coupled to the VCO through resistor 50 (in FIG. 2), provides an increased pull-in range and faster pull-in performance than does the first keyed phase comparator. Once synchronism is again achieved, the coincidence gate will detect coincidence between incoming sync and flyback pulses and cause the output of the mode switching means (comparator 500 in FIG. 2) to trigger keying transistor 550 into continuous conduction thereby holding the second keyed phase comparator in its inactive mode of operation.

It is noted that terminal 5 is shown as ground in FIG. 3. It is understood that each of the ground connections are interconnected on the integrated circuit substrate. Likewise, to simplify the schematic diagram of FIG. 3, terminal 14 is divided into two terminals whereas in the actual circuit only one such terminal 14 exists. Terminal 4, shown in FIG. 2, is coupled to a series connection of Zener diodes on the integrated circuit chip which are not shown in FIG. 3 but which can be employed to provide the reference voltage for the regulated transistor 40 shown in FIG. 1.

The reference voltage supply (400 in FIG. 2) comprises transistors 410, 420, 430, 440 and 450 and the associated circuit components 409-451. The circuit including transistors 440 and 450 is described in detail in an co-pending application entitled "Electrical Circuits" by A. L. R. Limberg, Ser. No. 680,483 filed on Nov. 3, 1967, issued as U.S. Pat. No. 3,555,309 and assigned to the present assignee. The direct voltage at an emitter terminal of transistor 440 is coupled to the input follower (250 in FIG. 2) by means of a resistor 275 to bias the keyed phase comparators. This voltage is also applied to a base terminal of transistor 410. The somewhat lower direct voltage present at the junction of an emitter terminal of transistor 420 and a collector terminal of transistor 430 is applied directly to a base terminal of transistor 780 in the current splitter 770 and through a resistor 375 to terminal 13. The application of this voltage at these circuit points serves to bias the current splitter to provide a balanced direct voltage bias to the current splitter, thereby eliminating the need for a direct voltage adjustment resistor.

What is claimed is:

1. A dual mode automatic phase control system comprising:

means for supplying synchronizing signals to said system;

a controllable oscillator wherein the frequency and phase of said oscillator signal are responsive to controlling signals;

first means comprising a filter circuit and a first phase comparator having an output coupled to said filter circuit, said phase comparator being responsive jointly to said synchronizing signals and to signals occuring in timed relation with said oscillator signal for coupling a first controlling signal to said oscillator during at least a hold-in portion of operation of said system;

means for detecting presence and absence of time coincidence between said synchronizing signals and a predetermined portion of said signals occurring in timed relation with said oscillator signal and for producing a mode controlling signal representative of substantially synchronized and non-synchronized operation of said oscillator, respectively; and second means comprising a second phase comparator having an output coupled to said oscillator and responsive jointly to said synchronizing signals, to said signals occurring in timed relation with said oscillator signal and to said mode controlling signal for coupling a second controlling signal to said oscillator only during a pull-in portion of operation of said system, said filter circuit and said first and second phase comparators being arranged such that the frequency bandwidth associated with said second controlling signal is greater than that of said first controlling signal.

2. A system as defined in claim 1 wherein said first phase comparator is supplied with and is operative to sample a sawtooth reference signal representative of the phase and frequency of said oscillator during a synchronization signal interval to produce said first controlling signal.

3. A system as defined in claim 2 wherein said filter circuit exhibits a predetermined bandwidth, said filter circuit being coupled between said first phase comparator and said controllable oscillator.

4. A system as defined in claim 3 wherein said second phase comparator is operative only when said controllable oscillator is not synchronized with respect to said synchronization signals, said second phase comparator being operative under such condition to sample a sawtooth reference signal representative of the phase and frequency of said controllable oscillator during a synchronization signal interval to produce said second controlling signal.

5. A system as defined in claim 2 wherein said filter circuit in combination with said first phase comparator exhibits a relatively narrow bandwidth and a portion of said filter circuit is coupled between said second phase comparator and said controllable oscillator.

6. A system as defined in claim 5 wherein said first and second phase comparators each are direct current coupled to said oscillator and quiescent voltages applied to said oscillator from said comparators are substantially equal.

7. A system as defined in claim 6 wherein said first and second phase comparators are substantially identical circuit configurations and are biased from a common bias source.

8. A dual mode automatic phase control system comprising:

a source of synchronizing signals, a controllable oscillator whose frequency is desired to be phase locked with said synchronizing signals, means for developing a sawtooth reference signal representative of the operating phase and frequency of said controllable oscillator, a first phase comparator coupled to said source of synchronizing signals and to said means for developing a reference signal and responsive jointly to said signals to develop a first output signal in the presence of said synchronizing signals, filter means coupled between said first phase comparator and said controllable oscillator, a coincidence gate for detecting time coincidence between said synchronizing signals and a portion of said reference signal, mode control means coupled to said coincidence gate for producing a different mode control signal for substantially synchronized and non-synchronized conditions as detected by said coincidence gate, a second phase comparator coupled to said source of synchronizing signals, to said means for developing a reference signal and to said mode control means and responsive jointly to said reference signals only upon the coincident application of a synchronizing signal and a predetermined mode control signal to develop a second output signal, and means coupled from said second phase comparator to said controllable oscillator for coupling said second output signal from said second phase comparator to said controllable oscillator, the frequency bandwidth of said second output signal being greater than that of signals coupled to said oscillator from said first phase comparator by said filter means.

9. A system as defined in claim 8 wherein said filter means comprises a multi-section low pass filter network and said second output is developed across a portion of said network which has a bandwidth substantially greater than the bandwidth of said filter means associated with said first phase comparator.

10. A system as defined in claim 9 wherein said first and second phase comparators have substantially balanced direct voltage output levels.

11. A dual mode automatic phase control system according to claim 10 wherein:

each of said first and second phase comparators is keyed for operation only during the occurrence of said synchronizing signals, said phase comparators providing a relatively high output impedance when not so keyed.

12. A dual mode automatic phase control system according to claim 11 wherein:

said first and second phase comparators are similarly biased so as to provide substantially equal quiescent output voltages to said oscillator.

13. A system as defined in claim 8 wherein said means for developing a sawtooth reference signal representative of the phase and frequency of said controllable oscillator comprises:

a source of pulses representative of the frequency of said controllable oscillator, and integration circuit means for developing a sawtooth reference waveform therefrom.

* * * * *